(12) United States Patent
Andreas-Schott et al.

(10) Patent No.: US 7,867,000 B1
(45) Date of Patent: Jan. 11, 2011

(54) STACK HEIGHT TOLERANCE COMPENSATING BUSBAR STRUCTURE

(75) Inventors: Benno Andreas-Schott, Triangel (DE); Thomas P. Migliore, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/498,440

(22) Filed: Jul. 7, 2009

(51) Int. Cl.
*H01R 13/64* (2006.01)
(52) U.S. Cl. ........................................ 439/251; 439/889
(58) Field of Classification Search ................. 439/248, 439/250–251, 208, 210–213, 883, 889
See application file for complete search history.

(56) References Cited

U.S. PATENT DOCUMENTS

| 4,845,589 | A | * | 7/1989 | Weidler et al. .............. 361/614 |
| 5,482,481 | A | * | 1/1996 | Takeuchi .................... 439/821 |
| 6,902,409 | B2 | * | 6/2005 | Banghard et al. ............. 439/64 |
| 7,238,441 | B2 | | 7/2007 | Andreas-Schott et al. |

* cited by examiner

*Primary Examiner*—Khiem Nguyen
(74) *Attorney, Agent, or Firm*—Fraser Clemens Martin & Miller LLC; J. Douglas Miller

(57) ABSTRACT

An electrical connector assembly is disclosed, the assembly having an electrical connector and a plurality of contacts coupled to a plurality of fixed bodies by plurality of fasteners adapted to facilitate relative movement of the electrical connector and the contacts relative to the fixed bodies while maintain an electrical communication.

18 Claims, 3 Drawing Sheets

FIG. 1

STACK HEIGHT TOLERANCE COMPENSATING BUSBAR STRUCTURE

FIELD OF THE INVENTION

The invention relates to electrical connectors and more particularly to a busbar for a fuel cell stack.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cell systems may also be used as stationary electric power plants in buildings and residences, as portable power in video cameras, computers, and the like. Typically, the fuel cell systems generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell system is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells, depending upon the context in which it is used. The plurality of cells is typically bundled together and arranged to form a stack, with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion media (hereinafter "DM's") or diffusion layers that are formed from a resilient, conductive, and gas permeable material such as carbon fabric or paper. The DM's serve as the primary current collectors for the anode and cathode, as well as provide mechanical support for the MEA. Alternatively, the DM may contain the catalyst layer and be in contact with the membrane. The DM's and MEA are pressed between a pair of electrically conductive plates which serve as secondary current collectors for collecting the current from the primary current collectors. The plates conduct current between adjacent cells internally of the stack in the case of bipolar plates and conduct current externally of the stack in the case of monopolar plates at the end of the stack.

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the protons through the PEM. The electrons are captured as useful energy through an external circuit and are combined with the protons and oxygen to produce water vapor at the cathode side.

Electrical connections at either end of a fuel cell stack must accommodate the varying height of the fuel cell stack. This must be done while maintaining strict space requirements, keeping cost low to manufacturers, and maintaining the ability to carry high currents. Prior attempts to maintain these parameters have been accomplished by using sliding joints, flexible braided connectors, and cantilever style bus bars.

Flexible braided connectors have failed as a practical means to meet the needs of vehicle manufacturers. The braided connectors contain air space in the braids and do not maintain the space efficiency of a solid connector. Despite a capability of allowing sufficient movement of a fuel cell stack, braided connectors have proven too expensive to be feasible, while additionally failing to fall within the stringent space requirements.

Cantilever style bus bars are an inadequate option as well. The cantilever style bus bars maintain electrical contact by a biasing force within the connector. While a cost effective option, the cantilever style bus bars require a large space to accommodate the varying height of a fuel cell stack, limiting the use thereof in vehicle applications.

Sliding joint connectors, commonly known as fork plugs, have a blade and a fork that allow for a small amount of movement while maintaining an electrical contact between the blade and the fork. For large sliding joint connectors, multiple lap joints and fasteners, along with electrical grease to reduce resistance, may be required. Additionally, the blades that connect to the fork are selected according to the height of the fuel cell stack. If the stack height changes over time, the sliding joint connector may not provide adequate engagement of the fork and blade. The sliding joint connectors have proved a restrictive option for electrical connections at the end of a fuel cell stack due to a high cost, space requirements, and limited range of movement. Accordingly, sliding joint connectors are not a desired choice for vehicle manufacturers.

It would be desirable to provide a cost effective electrical connector that allows for sufficient movement between two points in a fuel cell stack while maintaining strict space requirements.

SUMMARY OF THE INVENTION

Presently provided by the invention, a cost effective electrical connector that allows for sufficient movement between two points in an electrical system while maintaining strict space requirements, has surprisingly been discovered.

In one embodiment, an electrical connector assembly comprises an electrical connector formed from an electrically conductive material; a contact disposed between and abutting the electrical connector and a fixed body, the contact adapted to provide electrical engagement between the electrical connector and the fixed body; and a fastener adapted to couple the electrical connector and the contact to the fixed body, wherein the electrical connector rotates about the fastener in response to changes in height of the fixed body.

In another embodiment, an electrical connector assembly comprises an electrical connector formed from an electrically conductive material; a first contact disposed between and abutting the electrical connector and a first fixed body, the first contact adapted to provide electrical engagement between the electrical connector and the first fixed body; a second contact disposed between and abutting the electrical connector and a second fixed body, the second contact adapted to provide electrical engagement between the electrical connector and the second fixed body; and a plurality of fasteners adapted to couple the electrical connector and the first contact to the first fixed body and adapted to couple the electrical connector and the second contact, wherein the electrical connector rotates about the fasteners in response to changes in height of the first fixed body and the second fixed body.

In another embodiment, An electrical system for a fuel cell stack, the electrical system comprises an interface unit; a fuel cell stack having a terminal collector plate; and an electrical connector assembly coupled to the interface unit and the terminal collector plate, including a first contact disposed between and abutting the electrical connector and a first fixed body, the first contact adapted to provide electrical engagement between the electrical connector and the first fixed body, a second contact disposed between and abutting the electrical connector and a second fixed body, the second contact adapted to provide electrical engagement between the electrical connector and the second fixed body, and a plurality of fasteners adapted to couple the electrical connector and the first contact to the first fixed body and adapted to couple the electrical connector and the second contact, wherein the electrical connector rotates about the fasteners in response to changes in height of the first fixed body and the second fixed body.

BRIEF DESCRIPTION OF THE DRAWINGS

The above, as well as other advantages of the present invention, will become readily apparent to those skilled in the art from the following detailed description of embodiments of the invention when considered in the light of the accompanying drawings in which.

DETAILED DESCRIPTION OF EXEMPLARY EMBODIMENTS OF THE INVENTION

The following detailed description and appended drawings describe and illustrate an embodiment of the invention, The description and drawings serve to enable one skilled in the art to make and use the invention, and are not intended to limit the scope of the invention in any manner.

Figure 1:
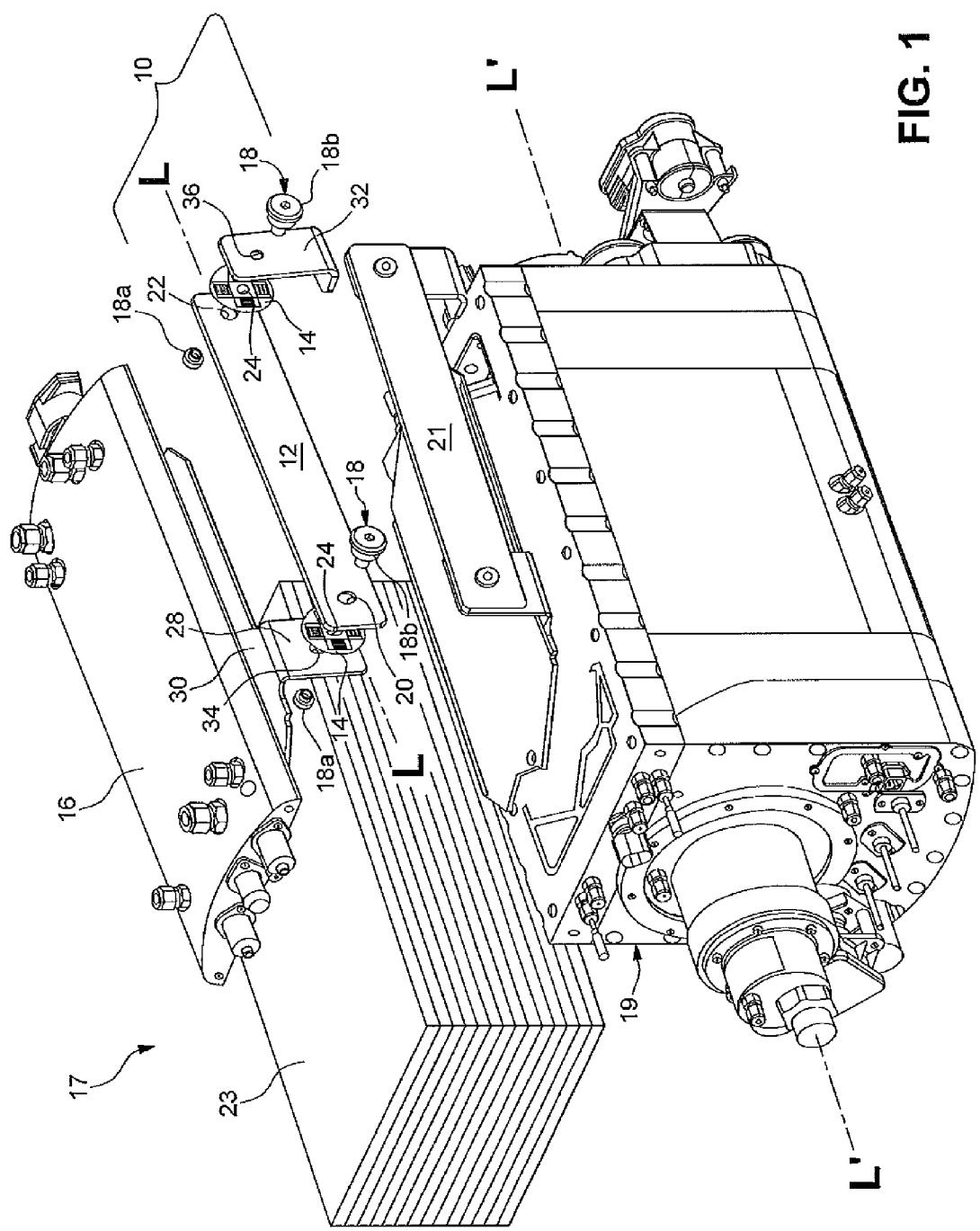
FIG. 1 is a partially exploded perspective view of fuel cell assembly with the fuel cell stack removed, including an electrical connector assembly according to an embodiment of the invention.
Figure 2:
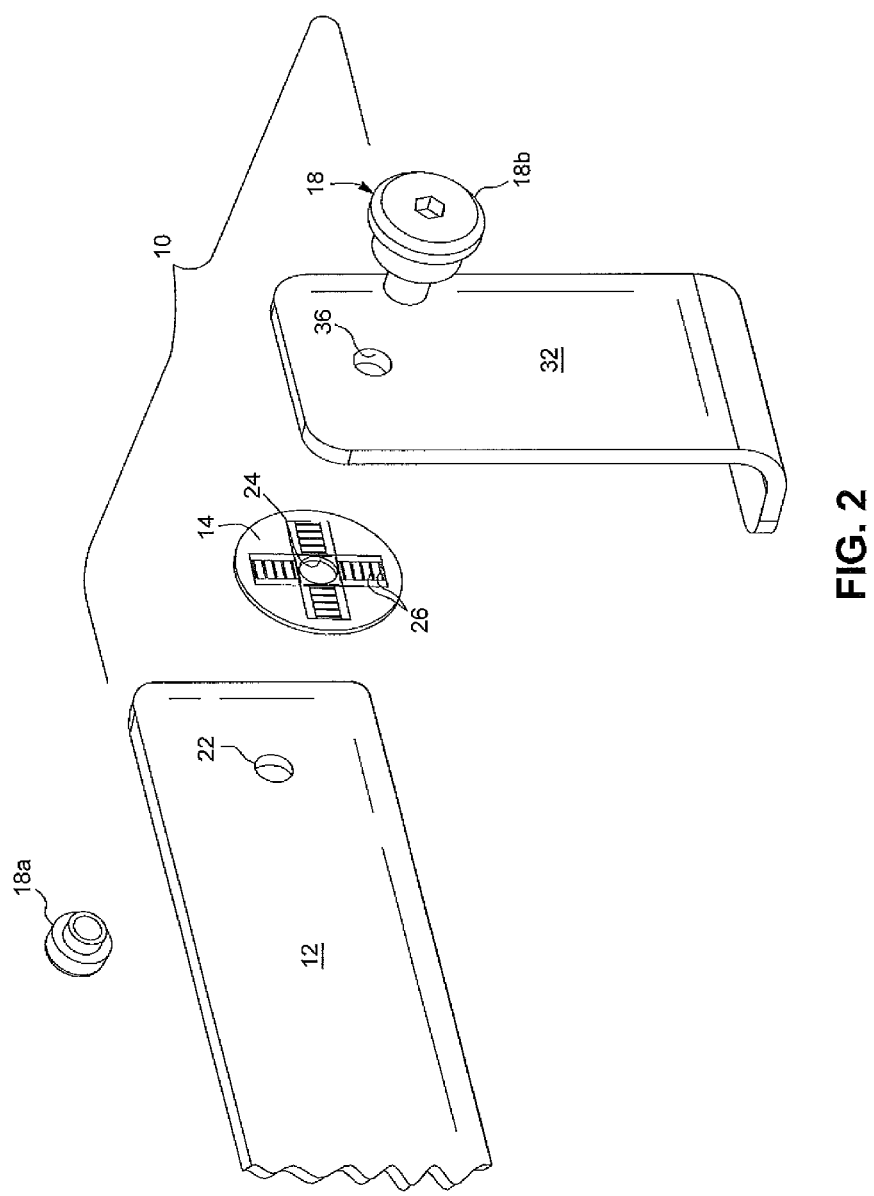
FIG. 2 is an enlarged exploded perspective view of the electrical connector assembly shown in FIG. 1.
Figure 3:
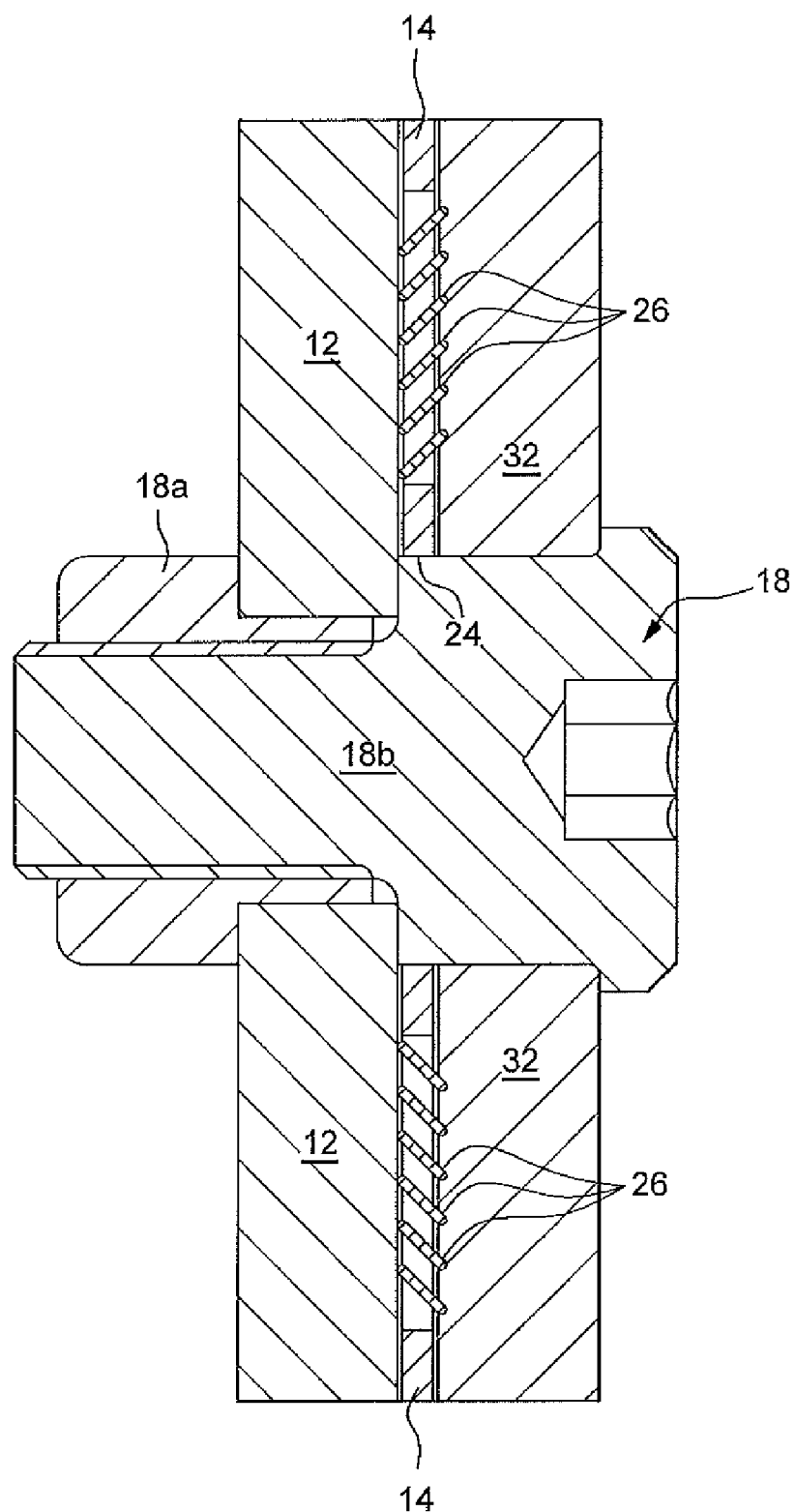
FIG. 3 is a cross-sectional view of the assembled electrical connector assembly coupled to a main connector of the fuel cell stack.

Referring to FIGS. 1-3, there is illustrated an electrical connector assembly 10 according to the present invention. The electrical connector assembly 10 includes an electrical connector 12 and a plurality of contacts 14. The electrical connector assembly 10 is adapted to be fastened to an upper end unit 16 of a fuel cell assembly 17 by a plurality of fasteners 18. The fuel cell assembly 17 includes the upper end unit 16, a lower end unit 19, and a fuel cell stack 23 disposed therebetween. The components of the fuel cell assembly 17 are typically held together by a compression system.

The electrical connector 12 includes spaced apart apertures 20, 22 formed therein. In the embodiment shown, the electrical connector 12 is a busbar in electrical communication with the anode side of the fuel cell stack 23 of the fuel cell assembly 17. The electrical connector 12 is formed from an electrically conductive material such as copper or aluminum, for example. In certain embodiments, the electrical connector 12 may be formed by stamping a length of metal having a rectangular cross-sectional shape from a blank. It is widely known that the cross-sectional area of a conductor is directly related to the amount of current a conductor is capable of carrying. These, as well as other characteristics, may be varied to create an electrical connector 12 of a desired length, shape, and flexibility to suit the particular need desired. It is understood that the electrical connector 12 may be formed by other methods, and the electrical connector 12 may have any number of apertures, as desired. The apertures 20, 22 have a circular shape and are adapted to receive a portion of one of the fasteners 18.

As best illustrated in FIGS. 2 and 3, the contacts 14 are contact discs or cams having an aperture 24 formed therein and is adapted to receive a portion of one of the fasteners 18. The contacts 14 include a plurality of louvers 26 and have a substantially circular shape. The contacts 14 may be contact discs sold under the MC®-Multilam® trademark and produced by MultiContact AG. The contacts 14 are adapted to transmit heavy currents and are formed from a conductive material such as copper, aluminum, or steel, for example. The louvers 26 may be formed from the same material as the remainder of the contacts 14, or formed from a different conductive material. Alternatively, the louvers 26 may be coated with a conductive material different from the material used to form the contacts 14. It is understood that the contacts 14 may have any shape, such as triangular or rectangular, as desired.

As best shown in FIG. 2, each fastener 18 is an assembly including a self-clinching nut 18a and bolt 18b such as self-clinching hardware sold under the PEM® trademark and manufactured by PennEngineering. Each fastener 18 is adapted to limit compression of the nut 18a and the bolt 18b on the contact 14 and the electrical connector 12 to facilitate relative movement of the contact 14 and the electrical connector 12 about the bolt 18b when the electrical connector assembly 10 is assembled. It is understood that each fastener 18 may be any conventional fastener such as a screw or threaded bolt and nut, for example, as desired. Other features may be incorporated into the electrical connector 12 such as a tab or a protuberance, to facilitate a sufficient electrical connection.

To assemble the electrical connector assembly 10, one of the contacts 14 is disposed adjacent a contact tab 28 of a terminal current collector plate 30, the contact tab 28 having an aperture 34 formed therein. The other contact 14 is disposed adjacent a main contact tab 32 of the fuel cell assembly 17 having an aperture 36. The main contact tab 32 is in electrical communication with another component of the fuel cell assembly 17 such as a fixed stack interface unit (not shown), another fuel cell stack (not shown), or other electronic components of the fuel cell system (not shown), for example. The electrical connector assembly 10 may also form a connection between two separate batteries or between a battery terminal and distribution block. The same benefits are evident when the electrical connector assembly 10 is used in non-automotive applications. The apertures 34, 36 are adapted to receive the fasteners 18. The tabs 28, 32 are spaced apart such that the apertures 34, 36 formed therein are respectively aligned with the apertures 20, 22 formed in the electrical connector 12.

The electrical connector 12 is disposed intermediate the tab 28 and one of the contacts 14 and the tab 32 and the other contact 14. The aperture 34 of the tab 28, the aperture 24 of one of the contacts 14, and the aperture 20 of the electrical connector 12 are aligned and the bolt 18b of one of the fasteners 18 is disposed therethrough. The nut 18a is then placed on the bolt 18b to couple the respective components together. The aperture 36 of the tab 32, the aperture 24 of the other contact 14, and the aperture 22 of the electrical connector 12 are aligned and the bolt 18b of the other fastener 18 is disposed therethrough. The nut 18a is then placed on the bolt 18b to couple the respective components together. Once assembled, the contacts 14 abut the electrical connector 12 and the respective tabs 28, 32 to provide sufficient electrical contact therebetween, while also facilitating the rotation of the contacts 14 and the electrical connector 12 relative to the fastener 18.

Upon assembly, the longitudinal axis L of the electrical connector 12 is substantially parallel to the longitudinal axis L' of the lower end unit 19. However, other arrangements of the electrical connector 12 may be used, as desired. For example, the electrical connector 12 may be disposed substantially perpendicular to the longitudinal axis of the lower end unit 19. Additionally, the electrical connector 12 may be positioned at any angle between the parallel and perpendicular arrangements, adapted for a particular need.

In use, the electrical connector assembly 10 is coupled to at least one movable component of an electrical system. As noted, the electrical connector assembly 10 may be used for automotive applications requiring a connector capable of carrying high currents in a compact space, at a low cost. For example, when the electrical connector assembly 10 is used as a connector for a fuel cell stack, the electrical connector assembly 10 may be provide electrical communication between a fuel cell stack and a fixed stack interface unit, between two separate stacks, between two separate batteries, or between a battery terminal and distribution block.

As shown in FIG. 1, the electrical connection 10 is coupled to terminal current collector plate 30 adjacent to the upper end unit 16, as described above. A second electrical connector assembly 21 is fixed to the lower end unit 19. The fuel cell stack 23 having a desired number of fuel cells is disposed between the upper end unit 16 and the lower end unit 19 with the electrical connector assembly 10 in electrical communication with the anode side of the fuel cell stack 23 and the second electrical assembly 21 in electrical communication with the cathode side of the fuel cell stack 23. During operation of the fuel cell assembly 17, humidity and temperature changes therein cause components of the fuel cell stack 23, such as membranes, diffusion media, and the like, to expand and contract resulting in height changes of the fuel cell stack 23. Because the contacts 14 and the electrical connector 12 are free to rotate about the fastener 18 while maintaining electrical contact therebetween and with the tabs 28, 32, as the height of the fuel cell stack 23 changes, the electrical connector 12 and the contacts 14 rotate and pivot about the fasteners 18 while electrical contact with the tabs 28, 32 is maintained. A height change of 7 mm of the fuel cell stack 23 results in 1.5 degrees of rotation of the electrical connector 12 and one of the contacts 14 about one of the fasteners 18, with a negligible amount of translation to the sides of the fuel cell stack 23, for example. Because the rotation of the contacts 14 and the electrical connector 12 is minimal, wear of the contacts 14, the electrical connector 12, and the tabs 28, 32, known as fret corrosion, due to rotation and movement of the various components is minimized.

As noted, the electrical connector assembly 10 may be used for automotive applications requiring a connector capable of carrying high currents in a compact space, at a low cost. By minimizing the complexity of and number of parts forming the electrical connector assembly 10, increased fuel cell stack height tolerances and an increase in a permissible amount of expansion of the fuel cell stack 23 and fuel cell assembly 17 are facilitated. Furthermore, by minimizing the number of parts of the electrical connector assembly 10, the possibility of disconnection of the components resulting in a loss of electricity during operation of the fuel cell assembly 17 is minimized, while a cost of the electrical connector assembly 10 is also minimized.

From the foregoing description, one ordinarily skilled in the art can easily ascertain the essential characteristics of this invention and, without departing from the spirit and scope thereof, make various changes and modifications to the invention to adapt it to various usages and conditions.

We claim:

1. An electrical connector assembly comprising:
   an electrical connector formed from an electrically conductive material;
   a contact disposed between and abutting said electrical connector and a fixed body, said contact adapted to provide electrical engagement between said electrical connector and the fixed body; and
   a fastener adapted to couple said electrical connector and said contact to the fixed body, wherein said electrical connector rotates about said fastener in response to changes in height of the fixed body.

2. The electrical connector according to claim 1, wherein said electrical connector is an elongate member having a substantially rectangular cross-sectional shape.

3. The electrical connector according to claim 1, wherein said contact is a cam.

4. The electrical connector according to claim 3, wherein said contact includes louvers.

5. The electrical connector according to claim 4, wherein said contact and the louvers are formed from a first material and the louvers are coated with a second material.

6. The electrical connector according to claim 5, wherein said contact is formed from a first material and the louvers are formed from a second material.

7. The electrical connector according to claim 6, wherein the first material is a steel and the second material is copper.

8. The electrical connector according to claim 1, further comprising a second contact disposed between and abutting said electrical connector and the fixed body.

9. The electrical connector according to claim 1, wherein said electrical connector is formed from one of copper, aluminum, nickel, and a combination thereof.

10. The electrical connector according to claim 1, wherein said electrical connector is produced by stamping sheet metal.

11. The electrical connector according to claim 1, wherein said fastener is a bolt and a nut.

12. The electrical connector according to claim 1, wherein the nut of said fastener is a self-clinching nut.

13. The electrical connector according to claim 1, wherein the fixed body is one of a collector plate and a main contact of a fuel cell stack.

14. An electrical connector assembly comprising:
    an electrical connector formed from an electrically conductive material;

a first contact disposed between and abutting said electrical connector and a first fixed body, said first contact adapted to provide electrical engagement between said electrical connector and the first fixed body;

a second contact disposed between and abutting said electrical connector and a second fixed body, said second contact adapted to provide electrical engagement between said electrical connector and the second fixed body; and a plurality of fasteners adapted to couple said electrical connector and said first contact to the first fixed body and adapted to couple said electrical connector and said second contact, wherein said electrical connector rotates about said fasteners in response to changes in height of the first fixed body and the second fixed body.

15. The electrical connector according to claim 14, wherein said first and second contacts are cams.

16. The electrical connector according to claim 15, wherein said first and second contacts include louvers.

17. The electrical connector according to claim 14, wherein said fastener is a bolt and a self-clinching nut.

18. The electrical connector according to claim 14, wherein the first fixed body is a collector plate and the second fixed body is a main contact of a fuel cell stack.

* * * * *